United States Patent [19]

Esche, Jr. et al.

[11] Patent Number: 6,107,258
[45] Date of Patent: *Aug. 22, 2000

[54] FUNCTIONALIZED OLEFIN COPOLYMER ADDITIVES

[75] Inventors: Carl Kurt Esche, Jr., Richmond; Anthony J. Rollin, Midlothian; Mark Thomas Devlin, Richmond, all of Va.

[73] Assignees: Ethyl Corporation, Richmond, Va.; DSM N.V., Geleen, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,871

[22] Filed: Oct. 15, 1997

[51] Int. Cl.$^7$ ................... C10M 159/12; C10M 149/12
[52] U.S. Cl. ................... 508/231; 508/239; 508/240; 508/241; 508/454; 508/455; 508/452; 525/298; 525/301
[58] Field of Search ................... 508/454, 455, 508/452, 231, 239, 240, 241; 525/298, 301

[56] References Cited

U.S. PATENT DOCUMENTS

| | | | |
|---|---|---|---|
| 3,868,330 | 2/1975 | Meinhardt et al. | 252/33.6 |
| 3,991,056 | 11/1976 | Okamoto et al. | 260/268 |
| 4,144,181 | 3/1979 | Elliott et al. | |
| 4,160,739 | 7/1979 | Stambaugh et al. | |
| 4,357,250 | 11/1982 | Hayashi | 252/51.5 |
| 4,668,412 | 5/1987 | Hart et al. | 252/51.5 |
| 4,863,623 | 9/1989 | Nalesnik | |
| 4,908,145 | 3/1990 | Fenoglio | |
| 5,075,383 | 12/1991 | Migdal et al. | |
| 5,147,569 | 9/1992 | DeRosa et al. | |
| 5,427,702 | 6/1995 | Chung et al. | 508/454 |
| 5,540,851 | 7/1996 | Lange | 508/454 |
| 5,567,344 | 10/1996 | Emert et al. | |
| 5,578,237 | 11/1996 | Emert et al. | |
| 5,744,429 | 4/1998 | Chung et al. | 508/454 |
| 5,747,596 | 5/1998 | Emert et al. | 525/298 |

FOREIGN PATENT DOCUMENTS

| | | |
|---|---|---|
| 0 333 371 A1 | 9/1989 | European Pat. Off. |
| 0 338 672 A1 | 10/1989 | European Pat. Off. |
| 0 730 022 | 9/1996 | European Pat. Off. |
| 1462287 | 7/1974 | United Kingdom |
| 1 554 947 | 10/1979 | United Kingdom |
| 2 055 852 | 3/1981 | United Kingdom |
| 2 069 505 | 8/1981 | United Kingdom |
| WO 94/13761 | 6/1994 | WIPO |

*Primary Examiner*—Jerry D. Johnson
*Attorney, Agent, or Firm*—Dennis H. Rainear; Thomas Hamilton

[57] ABSTRACT

This invention relates to a novel multi-functional fuel and lubricant additive that provides dispersancy properties as well as viscosity index improved credit, improved fuel economy and low temperature viscometric properties. The invention further relates to concentrates, fuel and lubricating oil compositions containing said additive.

39 Claims, No Drawings

FUNCTIONALIZED OLEFIN COPOLYMER ADDITIVES

BACKGROUND OF THE INVENTION

This invention relates to a novel multi-functional fuel and lubricant additive that provides dispersancy properties as well as viscosity index improver credit, improved fuel economy and low temperature viscometric properties. The invention further relates to concentrates, fuel and lubricating oil compositions containing said additive.

SUMMARY OF THE INVENTION

The present invention relates to novel functionalized olefin copolymers and their use as additives in fuel and lubricating oil compositions. The functionalized olefin copolymers of the present invention comprise an olefin copolymer on which has been grafted an ethylenically unsaturated carboxylic acid, or derivative thereof, to form an acylated olefin copolymer containing reactive carboxylic functionality. The acylated olefin copolymer is reacted with a coupling compound, which contains more than one amine, thiol and/or hydroxy functionality capable of reacting with the carboxylic functionality of preferably more than one acylated olefin copolymer to form the novel additives of the present invention. Additionally, the acylated olefin copolymers, either before or after reaction with the coupling compound, are reacted with a performance enhancing compound or compounds, i.e., compounds containing only one functional group capable of reacting with the carboxylic functionality of the acylated olefin copolymer, in order to obtain further benefits such as improved antioxidancy, antiwear and additional dispersancy properties.

DETAILED DESCRIPTION OF THE INVENTION

The olefin polymer or copolymer substrate employed in forming the novel additives of the present invention is derived from polymerizable $C_2$ to $C_{23}$ olefins. Such (co)polymers are typically produced from ethylene, propylene, 1-butene, 2-butene, isobutene, 1-hexene or 1-octene.

Hydrogenated random and block copolymers of a vinyl aromatic compound and a conjugated diene, or mixtures of conjugated dienes, are also suitable substrates for use in the present invention. Among these types of copolymers, hydrogenated random and block copolymers of isoprene-butadiene, styrene-isoprene or styrene-butadiene are preferred.

Preferred polymers for use in the present invention are copolymers of ethylene and one or more $C_3$ to $C_{23}$ alpha-olefins. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene, and styrene; also α,ω-diolefins such as 1,5-hexadiene, 1,6-heptadiene, 1,7-octadiene, etc., also branched chain alpha-olefins such as 4-methylbutene-1, 5-methylpentene-1 and 6-methylheptene-1 and mixtures thereof.

The ethylene-olefin copolymers may contain minor amounts of other olefinic monomers such as conjugated or nonconjugated dienes, and/or ethylenically unsaturated carboxylic compounds, so long as the basic characteristics (e.g., crystallinity and solubility in natural or synthetic oils) of the ethylene-olefin copolymers are not materially changed.

The polymerization reaction used to form the ethylene-olefin copolymer substrate is generally carried out in the presence of a conventional Ziegler-Natta or metallocene catalyst system. The polymerization medium is not specific and can include solution, slurry, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

Ethylene-propylene or higher alpha-olefin copolymers may consist of from about 15 to 80 mole percent ethylene and from about 85 to 20 mole percent propylene or a higher alpha-olefin with the preferred mole ratios being from about 25 to 75 mole percent ethylene and from about 75 to 25 mole percent of a $C_3$ to $C_{23}$ alpha-olefin. The most preferred copolymers for practice of this invention are comprised of from 30 to 70 mole percent propylene and 70 to 30 mole percent ethylene.

The number average molecular weight as determined by gel permeation chromatography, Mn, of the copolymer substrate employed in the present invention is between 700 and 500,000, preferably between about 3,000 and about 100,000, more preferably between about 3,000 and about 50,000. The molecular weight distribution, Mw/Mn, of the polymer substrates of the present invention is less than 15, preferably 1.0 to 10.

The terms polymer and copolymer are used generically to encompass ethylene copolymers or terpolymers.

An ethylenically unsaturated carboxylic acid material is grafted onto the prescribed polymer backbone to form an acylated ethylene copolymer. These carboxylic reactants which are suitable for grafting onto the ethylene copolymer contain at least one ethylenic bond and at least one, preferably two, carboxylic acid or its anhydride groups, or a polar group which is convertible into said carboxyl groups by oxidation or hydrolysis. Preferably, the carboxylic reactants are selected from the group consisting of acrylic, methacrylic, cinnamic, crotonic, and maleic, fumaric, and itaconic reactants of the general formula:

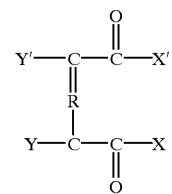

wherein R is an alkyl group having from 0–4 carbon atoms, X and X' are the same or different and are independently selected from the group consisting of —OH, —O—hydrocarbyl, —O—$M^+$ wherein $M^+$ represents one equivalent of metal, ammonium or amine cation, —$NH_2$, —Cl, —Br, and together X and X' can be —O— so as to form the anhydride, and Y and Y' are the same or different and are independently selected from the group consisting of hydrogen, branched or straight chain alkyls having 1–12 carbon atoms, a halogen atom, or an organo anhydride, ketone, or heterocyclic group having 2–12 carbon atoms. Ordinarily, the maleic or fumaric reactants will be maleic acid, fumaric acid, maleic anhydride, or a mixture of two or more of these. Maleic anhydride is generally preferred due to its commercial availability and ease of reaction.

The carboxylic reactant is grafted onto the prescribed polymer backbone in an amount of from about 0.5 to about 6 molecules of carboxylic reactant per molecule of polymer backbone based on acid number and activity of the final solution, preferably, at least 1 molecule of the carboxylic reactant per molecule of polymer backbone. More preferably, at least 1.3 molecules of the carboxylic reactant are reacted with each molecule of the polymer backbone. Throughout the specification this is referred to as the carboxylic reactant/olefin copolymer ratio.

The grafting reaction to form the acylated olefin copolymers is generally carried out with the aid of a free-radical initiator either in solution or in bulk, as in an extruder or intensive mixing device. When the polymerization is carried out in hexane solution, it is economically convenient to carry out the grafting reaction in hexane as described in U.S. Pat. Nos. 4,340,689, 4,670,515 and 4,948,842, incorporated herein by reference. The resulting polymer intermediate is characterized by having carboxylic acid acylating functionality randomly within its structure. When the site of acylation is randomly located along the copolymer backbone of the olefin copolymer and not exclusively at or near its terminus, the resulting coupled polymers of the present invention have a branched structure.

In the bulk process for forming the acylated olefin copolymers, the olefin copolymer is fed to rubber or plastic processing equipment such as an extruder, intensive mixer or masticator, heated to a temperature of 150° to 400° C. and the ethylenically unsaturated carboxylic acid reagent and free-radical initiator are separately co-fed to the molten polymer to effect grafting. The reaction is carried out optionally with mixing conditions to effect shearing and grafting of the ethylene copolymers according to U.S. Pat. No. 5,075,383, incorporated herein by reference. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic lubricating oil may optionally be added to the processing equipment after the venting stage to dissolve the acylated copolymer.

The free-radical initiators which may be used to graft the ethylenically unsaturated carboxylic acid material to the polymer backbone include peroxides, hydroperoxides, peresters, and also azo compounds and preferably those which have a boiling point greater than 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethyl-hex-3-yne-2,5-bis-tertiary-butyl peroxide. The initiator is used in an amount of between about 0.005% and about 1% by weight based on the weight of the reaction mixture.

Other methods known in the art for effecting reaction of olefin copolymers with ethylenic unsaturated carboxylic reagents such as halogenation reactions, thermal or "ene" reactions or mixtures thereof can be used instead of the free-radical grafting process. Such reactions are conveniently carried out in mineral oil or bulk by heating the reactants at temperatures of 250° to 400° C. under an inert atmosphere to avoid the generation of free radicals and oxidation byproducts.

The acylated olefin copolymers are reacted with coupling compounds and performance enhancing compounds. The reaction sequence can be in any order or simultaneous. In a preferred embodiment, the performance enhancing compound is first reacted with an oil or solvent solution of the acylated olefin copolymer followed by addition of the coupling compounds. Since both reactants combine with the free carboxylic functionality of the acylated copolymers, the ratio of coupling compound to the performance enhancing compound must be adjusted as well as the ratio of coupling compound and performance enhancing compound to acylated olefin copolymer to provide for the desired balance of viscosity index improvement-dispersancy and additional performance criteria.

For purposes of the present invention, coupling compounds are defined as those compounds containing more than one amine, thiol and/or hydroxy functional groups capable of reacting with the acylated olefin copolymer so as to link or couple two or more acylated olefin copolymers. It is preferred that the type and/or amount of coupling compound selected does not cause gelling of the polymer.

Coupling compounds for use in the present invention include organo polyamines, polyalcohols, polyhydroxy or thiol amines, amide-amines and amino guanidines wherein the organo group can be aliphatic, cycloaliphatic, aromatic, heterocyclic, or combinations thereof, and wherein the organo group can have organo heteroatom containing groups such as but not limited to —O—, —N—, —S—, —Si— and —P—.

Representative organo polyamines include triethylene tetramine, tetraethylene pentamine, pentaethylene hexamine, di-(1,3-propylene)triamine, tri-(1,3-propylene) tetramine, 1,3-diaminopropane, 1,4-diaminobutane, 1,5-diaminopentane, 1,6-diaminohexane, N,N-di-(2-aminoethyl)ethylene diamine, N,N-di-(2-aminoethyl) propylene diamine, N-(oleayl amino propyl)1,3-propylene diamine, 1,4-bis(2-aminoethyl) piperazine, polyethylene amine mixtures containing 5–7 N-atoms per molecule commercially available under the trade names Polyamine H, Polyamine 400, or Dow Polyamine E-100, and aromatic diamine mixtures such as ETHACURE® 300 (Albemarle Corporation) which is a mixture of 2,4- and 2,6-isomers of dimethylthiotoluene diamine.

Branched or star branched polyamines also known in the art as dendrimers are useful in the practice of thus invention. Such dendrimers are described in, for example, U.S. Pat. Nos. 4,587,329 and 4,737,550 and PCT published applications Nos. WO93/14147 and WO95/02008. A core group and repeating structural unit linked by a functional group defines the dendrimers. The repeating units are referred to as generations. Typically, polyamine dendrimers having 1 to 4 generations linked together via amine groups and terminated by a primary amine are particularly useful. A typical polyamine dendrimer is prepared, for example, with 1,4-diaminobutane as the core, which is then reacted via a Michael addition with acrylonitrile followed by hydrogenation of the cyano group to a primary amine. A second generation of alternating reactions with acrylonitrile, followed by hydrogenation will yield a polyamine with eight branches. Examples of useful core molecules include, but are not limited to, ammonia, polymethylenediamines, diethylenetriamines, diethylene tetramines, tetraethylenepentamine, linear and branched polyethylene imines, polyaminoalkylarenes, such as 1,3,5-tris-(aminomethyl) benzene, and melamine and its derivatives such as melamine tris-(hexamethylene diamine). Particularly useful as chemical compounds in forming the generations are α,β-unsaturated carboxylic and cyano compounds, aziridines and alkylene diamines.

Other suitable organo polyamines include polyoxyalkylene polyamines such as those of the formula:

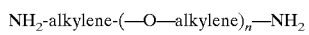

NH$_2$-alkylene-(—O—alkylene)$_n$—NH$_2$ where n has a value of about 3 to 59, preferably 10 to 35 and the alkylene groups are independently straight or branched chains containing about 2 to 7, preferably 2 to 4, carbon atoms. As well as polyoxyalkylene polyamines of the formula:

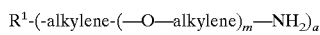

R$^1$-(-alkylene-(—O—alkylene)$_m$—NH$_2$)$_a$ where m has a value of about 1 to 28 with the provision that the sum of all carbon atoms is from about 2 to about 60, preferably about 2 to about 40, and R$^1$ is a polyvalent saturated hydrocarbon radical of up to ten carbon atoms wherein the number of substituents on the R$^1$ group is represented by the value 'a', which is a number of from 3 to 6. The alkylene groups are independently straight or branched chains containing about 2 to 7, preferably 2 to 4, carbon atoms.

The polyoxyalkylene polyamines described above are preferably polyoxyalkylene diamines and polyoxyalkylene triamines having an average molecular weight ranging from about 200 to about 4000, preferably 400 to about 2000. The preferred polyoxyalkylene polyamines include the polyoxyethylene and polyoxypropylene diamines and the polyoxyproylene triamines having average molecular weights ranging from about 200 to 2000. The polyoxyalkylene polyamines are commercially available and may be obtained, for example, from Huntsman Chemical Company under the trade name "Jeffamines D-230, D-400, D-1000, D-2000, T-403", etc.

Another particularly suitable class of organo polyamines comprise bis(p-amino cyclohexyl) methane (PACM) and oligomers and mixtures of PACM with isomers and analogs thereof containing on average, from 2 to 6 or higher, preferably 3 to 4, cyclohexyl rings per PACM oligomer molecule. The PACM structure can be represented by the formula:

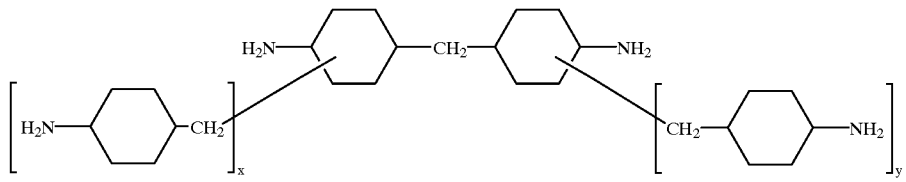

wherein x and y are the same or different and are integers of from 0 to 4, and preferably from 0 to 2, and wherein the sum of x+y is from 1 to 4, preferably 1 to 2.

The total nitrogen content of the PACM oligomers will comprise generally from 8 to 16 wt. %, and preferably from 10 to 14 wt. %.

The PACM oligomers can be obtained, e.g., by fractionation or distillation, as a heavies by-product or bottoms from the PACM-containing product produced by high pressure catalytic hydrogenation of methylene dianiline. The hydrogenation of methylene dianiline and the separation of PACM oligomers from the resulting hydrogenation product can be accomplished by known means, including the processes disclosed in U.S. Pat. Nos. 2,511,028; 2,606,924; 2,606,925; 2,606,928; 3,914,307; 3,959,374; 4,293,687; 4,394,523; 4,448,995 and 4,754,070, the disclosures of which are incorporated herein by reference in their entirety.

Suitable polyalcohol coupling compounds useful in the present invention are polyol compounds containing at least two reactive hydroxy groups. The polyalcohols generally comprise up to about 100 carbon atoms and from 2 to about 10, preferably 3 to about 8 hydroxy groups per molecule. These polyols can be quite diverse in structure and chemical composition. For example, they can be substituted or unsubstituted, hindered or unhindered, branched chain or straight chain, etc. as desired. Typical polyols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyalcohols include glycerol, monomethyl ether of glycerol, trimethylopropane, pentaerythritol, dipentaerythritol, tripentaerythritol, 1,2-propanediol, 1,2-butanediol, 1,4-butanediol, 2,3-hexanediol, pinacol, erythritol, arabitol, sorbitol, mannitol etc.

Cyclic poly(methylol) compounds, such as 2,2,6,6-tetramethylol cyclohexanol, tetrahydro-3,3,5,5-tetrakis-(hydroxymethyl)-4-pyranol, tetrahydro-3,3,5-tris-(hydroxymethyl)-5-methyl-4-pyranol, as well as heterocyclic polyols may also be used as coupling compounds in the present invention. The heterocyclic polyols and cyclic poly(methylol) compounds are described more fully in U.S. Pat. No. 4,797,219, the disclosure of which is incorporated herein in its entirety.

Organo polyhydroxy or thiol amines particularly useful in the practice of this invention include 2-(2-aminoethyl) aminoethanol, N-(2-hydroxypropyl) ethylene diamine, N,N-di-(2-hydroxyethyl) 1,3-propylene diamine, hexamethylene diamine-2-propylene oxide (HMDA-2PO), hexamethylene diamine-3-propylene oxide (HMDA-3PO), hexamethylene diamine-4-propylene oxide (HMDA-4PO), dimethyl aminopropylamine-2-propylene oxide (DMAPA-2PO), and Mannich condensation products which are formed from a hydroxyaromatic compound (e.g., phenol, alkyl substituted phenol etc.), an aldehyde (e.g., formaldehyde, formalin, clyoxal etc.), and a polyalkenyl polyamine (e.g., pentaethylene hexamine and tetraethylene pentamine). Suitable polythiol amines include aminomercaptotriazoles.

Organo amide-amines include the linear and branched products from the reaction of alkylene diamines and alkylacrylates such as ethylene diamine and methyl acrylate or 1,4-butane diamine and methyl acrylate; such amide-amines are described in 2nd Ed. Encyclopedia of Polymer Science and Engineering, Vol. 11, Wiley-Interscience, 1988. Amido-amine dendrimers, described in U.S. Pat. Nos. 4,587,329 and 4,737,550, are prepared by alternating reactions with alkylene diamines and alkyl acrylates or acrylamides. Amido-amine dendrimers having up to 4 generations can be used to couple the acylated olefin polymers.

Also useful are the amino guanidines such as amino guanidine bicarbonate (AGBC).

In preparing the coupled acylated olefin copolymers of the present invention, the molar charge of coupling compound per mole of ethylenically unsaturated carboxylic reagent (e.g. maleic anhydride) can vary depending upon the choice of coupling compound. Typically, 0.55 to 85 mole % of the coupling compound will be present per mole of carboxylic reagent. The reaction is conveniently carried out in natural or synthetic lubricating oil under inert conditions preferably in the presence of a surfactant. The ingredients are agitated at a temperature of 120° to 200° C., preferably 140° to 180° C. with a purge of inert gas to remove water and/or other low molecular weight by-products. The reaction time will vary from 30 minutes to 16 hours depending on particularly the choice of coupling compound and the specific process equipment.

Surfactants which may be used in carrying out the coupling reaction and the reaction with the performance enhancing compound(s) include but are not limited to those characterized as having (a) solubility characteristics compatible with mineral or synthetic lubricating oil, (b) boiling point and vapor pressure characteristics so as not to alter the flash point of the oil and (c) polarity suitable for solubilizing the coupling compound and the performance enhancing monomer. A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Representative examples are SURFONIC® N-40, N-60, L-24-5, L-46-7 (Huntsman Chemical Company), Neodol® 23-5 and 25-7 (Shell Chemical Company) and Tergitol® surfactants (Union Carbide).

The quantity of surfactant used depends primarily on its ability to solubilize the performance enhancing compound and the coupling compound. Typically, concentrations of 5 to 40 wt. % performance enhancing compound and/or coupling compound are employed. The surfactant can also be added separately, instead of or in addition to the concentrates discussed above, such that the total amount of surfactant in the finished dispersant is 10 wt. % or less.

In addition to the reaction with the coupling compounds, the acylated olefin copolymers are reacted with a wide range of organic compounds, i.e., performance enhancing compounds, in order to produce a grafted and derivatized ethylene copolymer which exhibits, for example, additional dispersancy properties, improved antioxidancy, and/or anti-wear properties. The performance enhancing compounds contain one primary amine, hydroxy or thiol group capable of reaction with the carboxylic group of the acylated olefin copolymer and another functional group, such as a heterocyclic or conjugated aromatic unit, or a combination thereof, to provide additional performance criteria. The term "additional performance criteria" refers to desired chemical and physical properties or functions which the multi-functional olefin copolymer impart as additives to lubricating oil or fuel in addition to basic viscosity index/dispersancy improvements.

A broad range of performance enhancing compounds including for example and not as a limitation monoamines, sterically hindered polyamines, heterocyclic thiols and hydroxyamines may be employed to further derivatize the acylated olefin copolymers of the present invention. These amines, hydroxys or thiols do not couple the acylated polymers, rather they react with available carboxylic groups, preferably anhydride groups, and are a means of incorporating antioxidancy, improving fuel economy and providing additional dispersancy to the polymer. Suitable performance enhancing compounds include aliphatic, cycloaliphatic, aromatic, and heterocyclic amines, hydroxys, or thiols which have only one primary amine, hydroxy or thiol group capable of reacting with the carboxylic functionality of the acylated olefin copolymer.

Specific examples of aryl polyamines include N-phenyl-phenylene diamine, N-naphthyl-phenylene diamine, and substituted forms thereof as represented by the formula:

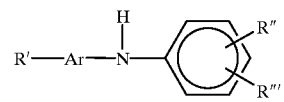

in which Ar is an aromatic group, R' is H, —NH$_2$, —NH-aryl-NH$_2$, —NH-aryl-alkyl-NH$_2$, —NH-alkyl-NH$_2$, —NH-aryl, —NH-aryl-alkyl, —NH-alkyl, or a branched or straight chain radical having 4 to 24 carbon atoms that can be alkyl, alkenyl, alkoxy, arylalkyl, hydroxyalkyl, or aminoalkyl, R" is —NH$_2$, —NH(CH$_2$)$_n$)$_m$NH$_2$, —CH$_2$—(CH$_2$)$_n$—NH$_2$, -aryl-NH$_2$ in which n and m have a value from 1 to 10, and R''' is —H, alkyl, alkenyl, alkoxy, arylalkyl, alkaryl having 4 to 24 carbon atoms and with the proviso that one and only one of R' and R" has a terminal NH$_2$.

Useful heterocyclic polyamines can be selected from the groups represented by the formula:

(a) an aminocarbazole

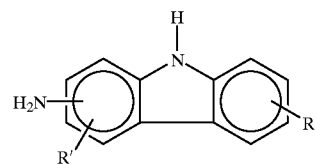

in which R and R' represent hydrogen, or an alkyl, alkenyl, or alkoxy radical having 1 to 14 carbon atoms;

(b) an aminoindole

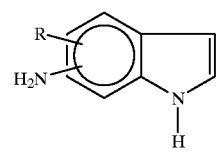

in which R represents hydrogen or an alkyl radical having from 1 to 14 carbon atoms;

(c) an aminopyrrole

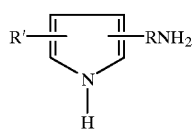

in which R is a divalent alkylene radical having 2 to 6 carbon atoms and R' is hydrogen or an alkyl radical having 1 to 14 carbon atoms;

(d) an amino-indazolinone

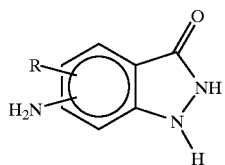

in which R is hydrogen or an alkyl radical having from 1 to 14 carbon atoms;

(e) an aminoperimidine

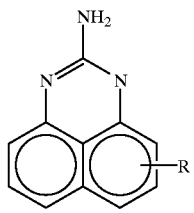

in which R represents hydrogen or an alkyl or alkoxyl radical having from 1 to 14 carbon atoms;

(f) an mercaptotriazole

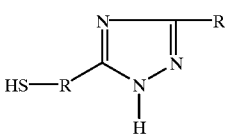

in which R can be absent or is a $(C_1-C_{10})$ linear or branched hydrocarbon selected from the group consisting of alkyl, alkenyl, arylalkyl, or aryl;

(g) an aminomorpholine, an aminopiperazine, an aminopiperidine

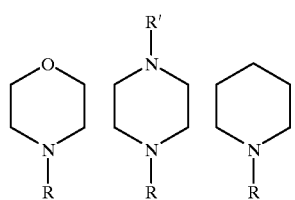

in which R is —$CH_2(CH_2)_n$—$NH_2$ wherein n is a value of 0 to 10 and R' is H, alkyl, alkenyl, alkoxy, arylalkyl or alkylaryl having 4 to 24 carbon atoms;

(h) an aminophenothiazine

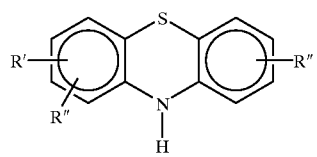

in which R' is —$NH_2$,

wherein n has a value from 1 to 10, $NH_2$-aryl-, $NH_2$-arylalkyl-, R" is H, or a $(C_1-C_{24})$ branched or straight chain alkyl, alkenyl, alkoxy or arylalkyl;

(i) an aminopyridines, aminopyrazines, aminopyrimidines

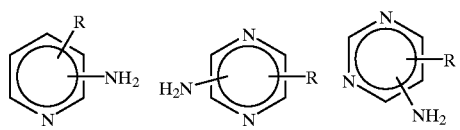

in which R represents hydrogen, —NH-aryl, —NH-aryl-alkyl, -NH-alkyl, aryl, alkyl, alkenyl, alkoxy, arylalkyl radical 1 to 18 carbon atoms;

(j) pyridines, pyrazines, pyrimidines

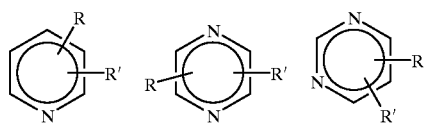

in which R represents hydrogen, —NH-aryl, —NH-aryl-alkyl, —NH-alkyl, aryl, alkyl, alkenyl, alkoxy, arylalkyl radical 1 to 18 carbon atoms, and R' is —$NH_2$, —$NH(CH_2)_n)_mNH_2$, —$CH_2$—$(CH_2)_n$—$NH_2$, or -aryl-$NH_2$ in which n and m have a value from 1 to 10;

(k) an aminoimidizolidone

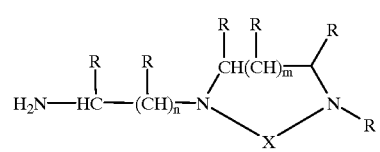

in which R in each instance is the same or different and maybe H, branched or straight chain radical having 1 to 24 carbon atoms that can be alkyl, alkenyl, alkoxy, or arylalkyl, n has a value of 0 to 12, m has a value of 0 to 2 and X is either O or S;

(l) an aminothiadiazole, an aminothiothiadiazole

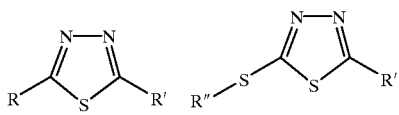

in which R is hydrogen, or a ($C_1$–$C_{10}$) branched or linear hydrocarbon selected from the group consisting of alkyl, alkenyl, arylalkyl or alkaryl, R' is —$NH_2$, —$CH_2$—$(CH_2)_n$—$NH_2$, —$CH_2$-aryl-$NH_2$ and n is a value of 0 to 10 and R" is ($C_1$–$C_{10}$) branched or linear hydrocarbon selected from the group consisting of alkyl, alkenyl, arylalkyl or alkaryl;

(m) an aminobenzotriazole

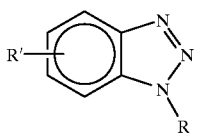

in which R is —$CH_2$—$(CH_2)_n$—$NH_2$ with n having a value of 0 to 10, R' is hydrogen or a ($C_1$–$C_{10}$) branched or linear hydrocarbon selected from the group consisting of alkyl, alkenyl, alkoxyl, arylalkyl or alkaryl;

(n) an aminoimidazoline, an aminothiazoline

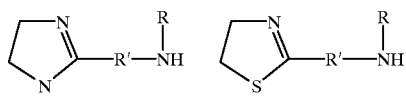

in which R' is a linear, cyclic, heterocyclic or heteroaromatic group optionally containing one or more atoms of oxygen, nitrogen, sulfur or phosphorus, and R is hydrogen or R';

Useful heterocyclic thiols can be selected from the groups represented by the formulas;

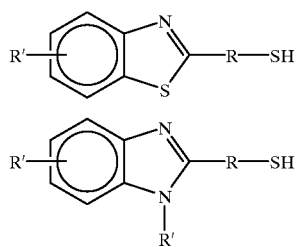

in which R can be absent or is a ($C_1$–$C_{10}$) linear or branched hydrocarbon selected from the group consisting of alkyl, alkenyl, aryl, or arylalkyl, and R' can be hydrogen, or R.

Use of preferred performance enhancing compounds is described in U.S. Pat. No. 4,863,623, 5,075,383, 5,112,508, 5,147,569, 5,160,446, 5,162,086, 5,167,845, 5,188,745, 5,200,100, 5,200,102, 5,238,588, 5,275,746, 5,409,623, 5,424,366, 5,429,757, 5,472,627, 5,474,694, 5,534,171, and 5,563,118 the disclosures of which are herein incorporated by reference.

The performance enhancing compounds are present in variable amounts depending upon the desired properties of the final product and the type and amount of coupling compound actually used. Preferably, the performance enhancing compound will be present in an amount of from 15 to 99.5 mol % per mol of acylating agent.

The coupling compounds and the performance enhancing compounds can be reacted with the acylated olefin copolymer in any sequence or simultaneously. Preference is given to a stepwise mode of addition and in a most preferred embodiment, the performance enhancing compound is reacted with the acylated olefin copolymer prior to addition of the coupling compound.

Typically, the performance enhancing compound(s) is (are) dissolved in a surfactant and added to a mineral or synthetic lubricating oil or solvent solution containing the acylated olefin copolymer. This solution is heated with agitation under an inert gas purge at a temperature in the range of 120° to 200° C. The solution of the coupling compound in surfactant or oil is then added. In some embodiments, it is preferable to add the performance enhancing compound-surfactant solution to the solution of acylated olefin copolymer and coupling compound after sufficient time for coupling reaction has been allowed. These reactions are carried out conveniently in a stirred reactor under nitrogen purge. However, as obvious to one skilled in the art, equally convenient is to add the surfactant solution of the performance enhancing compound, followed by a similar solution containing coupling compound to zones downstream from the graft reaction-vent zones in a twin screw extruder reactor.

The functionalized olefin copolymers of the present invention can be incorporated into a lubricating oil or a fuel in any convenient way. Thus, the functionalized olefin copolymers can be added directly to the lubricating oil or fuel by dispersing or dissolving the same in the lubricating oil or fuel at the desired level of concentration. Such blending into the lubricating oil or fuel can occur at room temperature or elevated temperatures. Alternatively, the functionalized olefin copolymers can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil or fuel to obtain the final formulation. Such additive concentrates will typically contain (on an active ingredient (A.I.) basis) from about 3 to about 45 wt. %, and preferably from about 10 to about 35 wt. %, functionalized olefin copolymer additive, and typically from about 20 to 90 wt %, preferably from about 40 to 60 wt %, base oil based on the concentrate weight.

The functionalized olefin copolymer products of the present invention possess very good dispersant properties. Accordingly, the functionalized olefin copolymer products are used by incorporation and dissolution into an oleaginous materials such as fuels and lubricating oils. When the products of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually by employed.

The fuel compositions of this invention can contain, in addition to the products of this invention, other additives that are well known to those of skill in the art. These can include anti-knock agents, deposit preventers or modifiers, dyes, cetane improvers, antioxidants, rust inhibitors, gum inhibitors, metal deactivators, and the like.

The functionalized olefin copolymer products of the present invention find their primary utility in lubricating oil compositions which employ a base oil in which the additives are dissolved or dispersed. Such base oils may be natural, synthetic or mixtures thereof. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain additional additives that will supply the characteristics that are required in the formulations. Among these types of additives are included viscosity index improvers, antioxidants, corrosion inhibitors, detergents, dispersants, pour point depressants, antiwear agents, antifoamants, demulsifiers and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent. Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the functionalized olefin copolymer would usually be employed in the form of a 10 to 50 wt. % concentrate, for example, in a lubricating oil fraction.

The functionalized olefin copolymers of the present invention will generally be used in admixture with a lube oil basestock, comprising an oil of lubricating viscosity, including natural and synthetic lubricating oils and mixtures thereof.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this invention include one of any number of commonly used synthetic hydrocarbon oils, which include, but are not limited to, poly-alpha-olefins, alkylated aromatics, alkylene oxide polymers, interpolymers, copolymers and derivatives thereof where the terminal hydroxyl groups have been modified by esterification, etherification etc, esters of dicarboxylic acids and silicon-based oils.

The functionalized olefin copolymers of the present invention may be post-treated so as to impart additional properties necessary or desired for a specific fuel or lubricant application. Post-treatment techniques are well known in the art and include boronation, phosphorylation, and maleination.

EXAMPLES

The experimental functionalized olefin copolymers set forth in the following examples were all prepared by the same general method. An acylated ethylene-propylene copolymer was prepared by free radically grafting maleic anhydride, in the presence of a solvent, onto a ethylene-propylene copolymer backbone. The acylated ethylene-propylene copolymer then underwent oil exchange, i.e., the solvent is removed and replaced with oil. The ethylene-propylene copolymer had a number average molecular weight of either about 10,000 or about 20,000 (see Tables below). The reaction conditions and molar proportions of maleic anhydride and ethylene-propylene copolymer were such that between about 1.8 and about 5 molecules of maleic anhydride were reacted with each molecule of the polymer backbone (see Tables below) to form the acylated ethylene-propylene copolymer. The acylated ethylene-propylene copolymer was reacted with the coupling compound, and optionally a performance enhancing compound (NPPDA), in the presence of a surfactant, at 160° C. for approximately six hours. The molar charge of the coupling compound per mol of maleic anhydride was varied (see Tables below). In the examples of Tables 1–5, the functionalized olefin copolymers of the present invention are 20 wt % actives. "Actives" includes polymers, coupling compounds and performance enhancing compounds but excludes solvent/diluent.

Table 1 demonstrates the effects of reacting an acylated olefin copolymer with a coupling compound. The polymer backbone in all of the examples is an ethylene-propylene copolymer having a number average molecular weight of approximately 20,000. The ethylene-propylene copolymers were reacted with maleic anhydride, following the above described procedures, to yield an acylated ethylene-propylene copolymer having an carboxylic reactant/olefin copolymer ratio of about 3,9. The Mannich coupling amine referred to throughout the following examples was the reaction product of a PIB-phenol, tetraethylene pentamine and formaldehyde.

The nitrogen levels and the kinematic viscosity data are presented below.

TABLE 1

| Ex. # | Mol % NPPDA | Mol % Coupling Compound | Nitrogen (ppm) | KV @ 100° C. (cSt) |
|---|---|---|---|---|
| 1*[1] | 0 | 0 | — | 876 |
| 2 | 75 | 25 AGBC | 1360 | 2260 |
| 3 | 75 | 25 AGBC | 1490 | 2471 |
| 4 | 60 | 40 AGBC | 1360 | 14873 |
| 5 | 75 | 25 HMDA-3PO | 1130 | 3273 |
| 6 | 75 | 5 Mannich | 1160 | 1345 |
| 7 | 75 | 5 Mannich | 1200 | 1425 |
| 8 | 50 | 10 Mannich | 972 | 7051 |

—Not measured
*Comparative example
[1]Acylated ethylene-propylene copolymer (Mn of 20,000) which has not been reacted with any coupling or performance enhancing compounds.

It is clear from Table 1 that the functionalized ethylene-olefin copolymers of the present invention give increased kinematic viscosities, compared to acylated ethylene-olefin copolymers which have not been further reacted with coupling or performance enhancing amines. An increase in kinematic viscosity indicates an improved thickening power of the additive.

Table 2 demonstrates the effects of reacting an acylated ethylene-olefin copolymer with a coupling compound on the dispersancy of the additive. The additives were the same as set forth in Table 1. The functionalized ethylene-olefin copolymers of the present invention show equivalent dispersancy performance in the Spot Dispersancy Test compared to commercially available dispersants. The Spot Dispersancy Test affords a measure of an additives' ability to disperse sludge. In the Spot Dispersancy Test, a dispersant candidate is mixed with an amount of Sequence VE sludge oil and is incubated at 300° F. for 16 hours. The resulting mixture (3–10 drops) is dropped onto a standard white blotter paper producing a sludge oil spot. After 24 hours the diameter of the sludge and the oil rings are measured. As dispersancy is the ability of an oil to keep sludge in suspension, dispersancy in the Spot Dispersancy Test is reflected by the differences in the diameters of the sludge and oil rings. The sludge ring being nearly as wide as the oil ring reflects high dispersancy. A rating (% SDT) is given by multiplying the quotient of the sludge ring and the oil ring diameters by 100. A high numerical rating is indicative of good dispersancy. The polymer backbone in examples 2 and 4–6 is an ethylene-propylene copolymer having a number average molecular weight of approximately 20,000. The ethylene-propylene copolymers were reacted with maleic anhydride, following the above described procedures, to yield an acylated ethylene-propylene copolymer having a carboxylic reactant/olefin copolymer ratio of about 3.9. The acylated ethylene copolymers were then reacted with a coupling amine, in the amounts indicated in the Table below, and a performance enhancing amine (NPPDA).

TABLE 2

| Ex. # | Mol % NPPDA | Mol % Coupling Compound | % SDT |
|---|---|---|---|
| 2 | 75 | 25 AGBC | 81.4 |
| 4 | 60 | 40 AGBC | 83.4 |
| 5 | 75 | 25 HMDA-3PO | 85.6 |
| 6 | 75 | 5 Mannich | 80.8 |
| 9*² | — | — | 35.4 |
| 10*³ | — | — | 75.3 |
| 11*⁴ | 100 | — | 84.5 |

*Comparative examples
²Sludge alone
³Commercially available post-treated Mannich dispersant having a nominal activity of 40 wt %
⁴Acylated ethylene-propylene copolymer (Mn of 10,000) which has been fully reacted with a performance enhancing compound (NPPDA) having a nominal activity of 32 wt %

Table 2 demonstrates that the functionalized ethylene copolymers of the present invention exhibit similar dispersancy properties to commercially available dispersants The nitrogen levels and kinematic viscosity data are presented below.

TABLE 3

| Ex. # | Mol % NPPDA | Mol % Coupling Compound | Nitrogen (ppm) | KV @ 100° C. (cSt) |
|---|---|---|---|---|
| 12* | 0 | 0 | — | 565 |
| 13 | 75 | 25 AGBC | 880 | 683 |
| 14 | 60 | 40 AGBC | 837 | 1035 |
| 15 | 75 | 5 Mannich | 753 | 586.7 |
| 16 | 50 | 10 Mannich | 627 | 808.2 |
| 17 | 75 | 25 HMDA-3PO | 618 | 833.7 |
| 18 | 50 | 50 HMDA-3PO | 662 | 1576 |

*Control sample, acylated ethylene-propylene copolymer (Mn of 20,000) which has not been reacted with any coupling or performance enhancing amines.

It is clear, from Table 3 that the functionalized olefin copolymers of the present invention give increased kinematic viscosities compared to acylated ethylene-olefin copolymers that have not been reacted with coupling or performance enhancing amines. As described above, an increase in kinematic viscosity indicates an improved thickening power of the additive.

In Table 4 additional formulations containing the additives set forth in Table 1 are shown. All of the formulations were SAE 5W-30 fully formulated motor oils containing Group I basestocks and commercially available additives including detergents, ZDDP, an anti-foam agent, antioxidants, a pour point depressant, a viscosity index improver, a friction modifier and a diluent process oil. Group I basestocks have a viscosity index between 80 and 120, and <90% saturates and/or >0.03% by weight sulfur.

TABLE 4

|  | 1*⁴ | 10*³ | 2 | 4 | 5 | 6 | 8 |
|---|---|---|---|---|---|---|---|
| Wt % of Additive | 4.1 | 4.1 | 4.1 | 4.1 | 4.1 | 4.1 | 4.1 |
| VII, wt % | 6 | 8.4 | 4.4 | 2.1 | 3.5 | 5.2 | 2.7 |
| 100N, wt % | 70.16 | 67.82 | 71.82 | 74.12 | 72.72 | 71.02 | 73.52 |
| 150N, wt % | 14.08 | 14.08 | 14.08 | 14.08 | 14.08 | 14.08 | 14.08 |
| VII Credit | 29 | — | 48 | 75 | 58 | 38 | 68 |
| KV @ 100 C. | 10.62 | 10.40 | 10.43 | 10.18 | 10.24 | 10.36 | 10.22 |
| CCS @ −25 C. | 3339 | 3478 | 2747 | 2571 | 2752 | 2863 | 2654 |

*: Comparative examples
³: Commercially available post-treated Mannich dispersant
⁴: Acylated ethylene-propylene copolymer (Mn of 10,000) which has been fully reacted with a performance enhancing amine (NPPDA)

Table 3 demonstrates the effects of reacting an acylated ethylene copolymer with a coupling amine. The polymer backbone in all of the examples is an ethylene-propylene copolymer having a number average molecular weight of approximately 20,000. The ethylene-propylene copolymers were reacted with maleic anhydride, by the above-described procedures, to yield an acylated ethylene-propylene copolymer having an carboxylic reactant/olefin copolymer ratio of about 1.8.

It is clear, upon examination of Table 4, that the use of the ethylene-olefin copolymer additives of the present invention gives an improved (higher) viscosity index improver credit (VII Credit) as compared to other commercially available dispersants at constant kinematic viscosities. This allows one to use less VII in formulating the finished oils. Further, the additives of the present invention yield finished oils that exhibit a cold cranking simulator advantage over oils containing additives outside of the scope of the present invention. This is evidenced by the desirable lower values of CCS @ −25 C. These oils also have acceptable haze and color.

Table 5 sets forth additional formulations containing the additives set forth in Table 1. All of the formulations were SAE 5W-30 fully formulated motor oils containing Group II basestocks and commercially available additives including detergents, ZDDP, an anti-foam agent, antioxidants, a pour point depressant, a viscosity index improver, a friction modifier and a diluent process oil. Group II basestocks are characterized as having a viscosity index between 80 and 120, and >90% saturates and/or <0.03% sulfur.

TABLE 5

|  | 10*[3] | 2 | 5 | 6 |
|---|---|---|---|---|
| Wt % of Additive | 4 | 4 | 4 | 4 |
| VII, wt % | 8.8 | 4.5/4.7 | 3.4 | 4.9 |
| 100N, wt % | 68.6 | 59.4 | 58.7 | 59.0 |
| 240N, wt % | 14.5 | 28.0 | 29.8 | 28.0 |
| VII Credit | — | 49/47 | 61 | 44 |
| KV @ 100 C. | 10.44 | 10.51/10.72 | 10.49/10.55 | 10.43/10.45 |
| CCS @ −25 C. | 3354 | 3202/3247 | 3159/2989 | 2665/3159 |
| MRV @ −35 C. | 32162 | 31513 | 29476 | 32659 |
| SimD, wt % | 16.6 | 14.2 | 14.0 | 14.1 |

*Comparative examples
[3]Commercially available post-treated Mannich dispersant

It is clear, upon examination of Table 5, that the use of the ethylene-olefin copolymer additives of the present invention gives an improved (higher) viscosity index improver credit (VII Credit) as compared to other commercially available dispersants at constant kinematic viscosities. This allows one to use less VII in formulating the finished oils. Further, by using the ethylene-olefin copolymers of the present invention one is able to increase the 240 neutral content of the oils and therefore lower the volatility of the finished oil as evidenced by desirable lower SimD wt % results. Further, the additives of the present invention yield finished oils that exhibit a cold cranking simulator advantage over oils containing additives outside of the scope of the present invention. This is evidenced by the lower values of CCS @ −25 C Table 6 demonstrates the effects of reacting an acylated ethylene-olefin copolymer with a coupling compound and a performance enhancing compound. The polymer backbone in all of the examples is an ethylene-propylene copolymer having a number average molecular weight of approximately 10,000. In the examples of Tables 6–7, the functionalized ethylene-olefin copolymers of the present invention contain 33 wt % actives. The ethylene-propylene copolymers were reacted with maleic anhydride, following the above-described procedures, to yield an acylated ethylene-propylene copolymer having an carboxylic reactant/olefin copolymer ratio of about 1.8.

The nitrogen levels and kinematic viscosity data are presented below.

TABLE 6

|  | Mol % NPPDA | Mol % Coupling Compound | Nitrogen (ppm) | KV @ 100 C. (cSt) |
|---|---|---|---|---|
| 1 | 80 | 20 AGBC | 2180 | 815.2 |
| 2 | 60 | 40 AGBC | 2410 | 1067 |
| 3* | 0 | 100 AGBC | 3790 | 13,867** |
| 4 | 60 | 20 HMDA-3PO | 1400 | 1023 |
| 5 | 20 | 40 HMDA-3PO | 1120 | 2622 |
| 6* | 0 | 100 HMDA-3PO | 1380 | 294,958** |

TABLE 6-continued

|  | Mol % NPPDA | Mol % Coupling Compound | Nitrogen (ppm) | KV @ 100 C. (cSt) |
|---|---|---|---|---|
| 7 | 60 | 20 HMDA-4PO | 1510 | 941.9 |
| 8 | 20 | 40 HMDA-4PO | 1170 | 1356.4 |
| 9 | 60 | 20 E-300 | 1720 | 688.7 |
| 10 | 20 | 40 E-300 | 1300 | 699.5 |
| 11 | 20 | 80 HMDA-2PO | 1090 | 2574 |
| 12* | 0 | 100 HMDA-2PO | 1660 | 334,531** |
| 13[1]* | 100 | 0 | 1750 | 812 |
| 14[1]* | 100 | 0 | 1810 | 608 |

[1]Control sample, acylated ethylene-propylene copolymer (Mn of 10,000) which has been fully reacted with a performance enhancing amine (NPPDA).
*Comparative Examples
**These formulations exceeded the limits of the test and are estimated viscosities.

It is clear from Table 6 that the functionalized ethylene copolymers of the present invention give increased kinematic viscosities, compared to acylated olefin copolymers that have not been reacted with performance enhancing compounds (Comparative Examples 13 and 14) An increase in kinematic viscosity indicates an improved thickening power of the additive, however, the extremely high kinematic viscosities of Comparative Example 3, 6 and 12 are outside the range of useable additives.

Boundary lubrication occurs when fluid films are thin enough that opposing metal surfaces interact with one another. When this interaction occurs friction increases. In an engine, an increase in friction results in a decrease in fuel economy.

The boundary friction properties of fluids can be measured using a High Frequency Reciprocating Rig (HFRR). The HFRR operates by oscillating a ball across a plate in a sample cell containing 1–2 ml of sample. The frequency of oscillation, path length that the ball travels, load applied to the ball and test temperature can be controlled. By controlling these parameters the boundary frictional properties of a fluid can be assessed.

The novel polymeric additives of the present invention, as well as comparative dispersants, were blended into SAE 5W-30 fully formulated motor oils. The boundary frictional properties of these fluids were assessed using an HFRR under the same conditions described in "Predicting Seq. VI and VIA Fuel Economy from Laboratory Bench Tests" by C. Bovington, V. Anghel and H. A. Spikes (SAE Technical Paper 961142), that is, 4N load, 1 mm path length, 20 Hz frequency. The frictional properties were measured at 130° C.

Table 7, below, demonstrates the improvements in boundary friction results obtained by the addition of the novel functionalized ethylene copolymers of the present invention to motor oils as compared to conventional Mannich dispersants as well as acylated ethylene copolymers reacted only with performance enhancing amines. As mentioned above, lower boundary friction results are indicative of improved fuel economy. Table 7 sets forth the amount of conventional Mannich dispersant present in the motor oil, the amount of olefin copolymer additive present in the motor oil, the number average molecular weight (Mn) of the olefin copolymer backbone, the carboxylic reactant/olefin copolymer ratio, the type of amine reacted with the acylated ethylene copolymer, the mol % of the coupling amine, and the boundary friction results. In all cases, if the mol % of coupling amine is less than 100, NPPDA is present in a molar amount theoretically sufficient to react with the remaining anhydride groups.

Comparative Examples 1–6 represent formulations which contains a Mannich dispersant and no ethylene copolymer. Comparative Examples 15–26 represent formulations containing acylated ethylene copolymers which have only been reacted with a non-cross-linking performance enhancing amine. Examples 7–14 and 27–31 represent formulations within the scope of the present invention. All of the tested oils were based on an SAE 5W-30 fully formulated passenger car motor oil. The oils were formulated using commercially available detergents, ZDDP, anti-oxidants, an anti-foam agent, a pour point depressant, rust inhibitors, a viscosity index improver a friction modifier and a diluent process oil.

specific exemplifications set forth hereinabove. Rather, this invention is within the spirit and scope of the appended claims, including the equivalents thereof available as a matter of law.

The patentee does not intend to dedicate any disclosed embodiments to the public, and to the extent any disclosed modifications or alterations may not literally fall within the scope of the claims, they are considered to be part of the invention under the doctrine of equivalents.

We claim:

1. A process for preparing a functionalized olefin copolymer comprising the steps of:
   (1) preparing an oil or solvent solution of an acylated olefin copolymer,

| Ex. # | wt. % Mannich | wt. % EP | Mn ($10^3$) | Carboxylic reactant/olefin | Coupling Compound (Mol %) | NPPDA (Mol %) | Boundary Friction |
|---|---|---|---|---|---|---|---|
| 1* | 4.5 | 0 | — | — | — | — | 0.122 |
| 2* | 4 | 0 | — | — | — | — | 0.116 |
| 3* | 4 | 0 | — | — | — | — | 0.115 |
| 4* | 7 | 0 | — | — | — | — | 0.114 |
| 5* | 4 | 0 | — | — | — | — | 0.114 |
| 6* | 4.1 | 0 | — | — | — | — | 0.110 |
| | | | Avg. Boundary Friction[1]/% Reduction[2] | | 0.115/0% | | |
| 7 | 2 | 2.05 | 10 | 1.8 | 40 AGBC | 60 | 0.105 |
| 8 | 0 | 4 | 20 | 3.9 | 25 AGBC | 75 | 0.098 |
| 9 | 0 | 4 | 20 | 3.9 | 25 AGBC | 75 | 0.098 |
| 10 | 0 | 4.1 | 20 | 3.9 | 25 AGBC | 75 | 0.099 |
| 11 | 0 | 4.1 | 20 | 3.9 | 40 AGBC | 60 | 0.098 |
| | | | Avg. Boundary Friction/% Reduction | | 0.100/13% | | |
| 12 | 2 | 2.05 | 10 | 1.8 | 20 HMDA-3PO | 60 | 0.104 |
| 13 | 0 | 4 | 20 | 3.9 | 25 HMDA-3PO | 75 | 0.099 |
| 14 | 0 | 4.1 | 20 | 3.9 | 25 HMDA-3PO | 75 | 0.098 |
| | | | Avg. Boundary Friction/% Reduction | | 0.100/13% | | |
| 15* | 0 | 1 | 10 | 2.4 | — | 100 | 0.104 |
| 16* | 0 | 1 | 20 | 5.0 | — | 100 | 0.103 |
| 17* | 2 | 2 | 10 | 1.8 | — | 100 | 0.105 |
| 18* | 2 | 2 | 10 | 2.5 | — | 100 | 0.104 |
| 19* | 0 | 2 | 10 | 1.8 | — | 100 | 0.103 |
| 20* | 0 | 2 | 10 | 1.8 | — | 100 | 0.102 |
| 21* | 0 | 2 | 10 | 1.8 | — | 100 | 0.102 |
| 22* | 0 | 2 | 10 | 2.4 | — | 100 | 0.102 |
| 23* | 2 | 2 | 10 | 1.8 | — | 100 | 0.100 |
| 24* | 0 | 2 | 2 | 5.0 | — | 100 | 0.104 |
| 25* | 2 | 3.4 | 20 | 5.0 | — | 100 | 0.105 |
| 26* | 0 | 4.16 | 10 | 1.8 | — | 100 | 0.099 |
| | | | Avg. Boundary Friction/% Reduction | | 0.103/11% | | |
| 27 | 0 | 4 | 20 | 3.9 | 5 Mannich | 75 | 0.098 |
| 28 | 0 | 4 | 20 | 3.9 | 5 Mannich | 75 | 0.097 |
| 29 | 0 | 4.1 | 10 | 1.8 | 30 Mannich | 25 | 0.099 |
| 30 | 0 | 4.1 | 20 | 3.9 | 5 Mannich | 75 | 0.102 |
| 31 | 0 | 4.1 | 20 | 3.9 | 10 Mannich | 50 | 0.099 |
| | | | Avg. Boundary Friction/% Reduction | | 0.099/14% | | |

*Comparative Examples
[1]: Average for all results in amine class
[2]: Percent reduction in boundary friction compared to oil without ethylene copolymer (i.e., Comparative Examples 1–6)

It is clear from the above Table that oils containing the functionalized ethylene-olefin copolymers of the present invention exhibit improved (i.e., reduced) boundary friction, which is indicative of improved fuel economy as described above, compared to oil compositions containing no ethylene copolymer (Examples 1–6) and oil compositions containing acylated ethylene-olefin copolymers which have been further reacted only with performance enhancing compounds (Examples 15–26).

This invention is susceptible to considerable variation in its practice. Accordingly, this invention is not limited to the (2) preparing a solution of at least one performance enhancing compound at a concentration of from 5 to 40 weight percent in surfactant,
   (3) preparing a solution of at least one coupling compound at a concentration of from 5 to 40 weight percent in surfactant, wherein said coupling compound contains more than one amino, hydroxy and/or thiol group capable of reacting with the carboxylic group of the acylated olefin copolymer, and mixing and heating the solutions (1), (2) and (3) in any order or simultaneously at a temperature of 120° to 200° C. for a time sufficient to effect reaction of the amino, hydroxy or thiol group of the performance enhancing compound and the coupling compound with the carboxylic group of the acylated olefin copolymers and to effect coupling of at least two acylated olefin copolymers; wherein said coupling compound is selected from the group consisting of organic polyamines, polyalcohols, polyhydroxy or thiol amines, amide-amines and amino guanidines; and wherein the performance enhancing compound is selected from the group consisting of monoamines, sterically hindered polyamines, heterocyclic thiols and hydroxyamines; and wherein said surfactant is selected from the reaction products of aliphatic and aromatic hydroxy compounds with ethylene oxide, propylene oxide or mixtures thereof.

2. The process of claim 1 wherein (a) solutions (1) and (2) are mixed and heated at a temperature of 120° to 200° C. for a time sufficient to effect reaction of the amino, hydroxy or thiol group of the performance enhancing compound with the carboxylic group of the acylated olefin copolymers, then (b) the resulting reaction solution of (a) is mixed with (3) and heated at a temperature of 120° to 200° C. for a time sufficient to effect coupling of at least two acylated olefin polymers.

3. The process of claim 1 wherein (1), (2) and (3) are simultaneously mixed and heated at a temperature of from 120° C. to 200° C. for a time sufficient to couple at least two acylated olefin copolymers via their carboxylic groups and to react excess carboxylic groups with the performance enhancing compound.

4. The process of claim 1 wherein the olefin copolymer used in preparing the acylated and functionalized olefin copolymers has a number average molecular weight of from 700 to 500,000.

5. The process of claim 1 wherein the acylated olefin copolymer contains 0.5 to 6 molecules of carboxylic reactant per molecule olefin copolymer.

6. The process of claim 1 wherein the olefin copolymer substrate is selected from copolymers of polymerizable $C_2$ to $C_{23}$ olefins, hydrogenated random and block copolymers of a vinyl aromatic compound and at least one conjugated diene, or hydrogenated random and block copolymers of mixtures of conjugated dienes.

7. A functionalized olefin copolymer comprising the reaction product of a) an acylated olefin copolymer, wherein said acylated olefin copolymer comprises an olefin copolymer substrate grafted with from about 0.5 to about 6 molecules of ethylenically unsaturated carboxylic acid, or derivative thereof, per molecule of olefin copolymer; b) at least one coupling compound, wherein said coupling compound contains more than one amine, thiol and/or alcohol functionality capable of reacting with the acylated olefin copolymer and is selected from the group consisting of mixtures of 2,4- and 2,6-isomers of dimethylthiotoluene diamine, polyhydroxy amines, and amino guanidines; and c) an aromatic amine performance enhancing compound selected from the group consisting of aryl polyamines, aminocarbazoles, aminoindoles, aminopyrroles, amino-indazolinones, aminoperimidines, mercaptotriazoles, aminophenothiazines, pyridines, pyrazines, pyrimidines, aminothiadiazoles, aminothiothiadiazoles, aminobenzotriazoles, mercaptobenzothiazoles, and mercaptobenzoimidazoles; and wherein the acylated olefin copolymer is reacted with from 0.5 to 85 mol % coupling compound and 15 to 99.5 mol % performance enhancing compound per mol of acylating agent.

8. The functionalized olefin copolymer of claim 7 wherein the olefin copolymer substrate is selected from copolymers of polymerizable $C_2$ to $C_{23}$ olefins, hydrogenated random and block copolymers of a vinyl aromatic compound and at least one conjugated diene, or hydrogenated random and block copolymers of mixtures of conjugated dienes.

9. The functionalized olefin copolymer of claim 8 wherein the olefin copolymer substrate comprises an ethylene-propylene copolymer.

10. The functionalized olefin copolymer of claim 7 wherein said performance enhancing compound comprises N-phenyl-phenylene diamine.

11. The functionalized olefin copolymer of claim 7 wherein said coupling compound comprises at least one member selected from the group consisting of aminoguanidine bicarbonate, hexamethylene diamine-2-propylene oxide, hexamethylene diamine-3-propylene oxide, hexamethylene diamine-4-propylene oxide, a Mannich condensation product formed from a hydroxyaromatic compound, an aldehyde and a polyalkenyl polyamine, and mixtures thereof.

12. An oil concentrate containing, on an active ingredient basis, 20 to 90 weight percent of a carrier or diluent oil and from about 3 to 45 weight percent of the functionalized olefin copolymer of claim 7.

13. The oil concentrate of claim 12 further comprising at least one additive selected from the group consisting of viscosity index improvers, antioxidants, corrosion inhibitors, detergents, dispersants, pour point depressants, antiwear agents, antifoamants, demulsifiers and friction modifiers.

14. A lubricating oil composition comprising a major amount of an oil of lubricating viscosity and a minor amount of the functionalized olefin copolymer of claim 7.

15. The lubricating composition of claim 14 further comprising at least one additive selected from the group consisting of viscosity index improvers, antioxidants, corrosion inhibitors, detergents, dispersants, pour point depressants, antiwear agents, antifoamants, demulsifiers and friction modifiers.

16. A method of improving the fuel economy of a vehicle having a crankcase containing a lubricating oil wherein said method comprises adding to and operating in the crankcase of the vehicle the lubricating oil composition of claim 14.

17. A method of improving the low temperature viscometric properties of a lubricating oil, said method comprising adding to an oil of lubricating viscosity a minor amount of the functionalized olefin copolymer of claim 7.

18. A functionalized olefin copolymer comprising the reaction product of a) an acylated olefin copolymer, wherein said acylated olefin copolymer comprises an olefin copolymer substrate grafted with from about 0.5 to about 6 molecules of ethylenically unsaturated carboxylic acid, or derivative thereof, per molecule of olefin copolymer; b) at least one coupling compound, wherein said coupling compound contains more than one amine, thiol and/or alcohol functionality capable of reacting with the acylated olefin copolymer and is selected from the group consisting of organic polyamines, polyalcohols, polyhydroxy or thiol amines, amide-amines and amino guanidines; and c) an aromatic amine performance enhancing compound selected from the group consisting of: aryl polyamines, aminocarbazoles, aminoindoles, aminopyrroles, amino-indazolinones, aminoperimidines, mercaptotriazoles, aminophenothiazines, pyridines, pyrazines, pyrimidines, aminothiadiazoles, aminothiothiadiazoles, aminobenzotriazoles, mercaptobenzothiazoles, and mercaptobenzoimidazoles; and wherein the acylated olefin copolymer is reacted with from 0.5 to 85 mol% coupling compound and 15 to 99.5 mol% performance enhancing compound per mol of acylating agent.

19. The functionalized olefin copolymer of claim 18 wherein the olefin copolymer substrate is selected from copolymers of polymerizable $C_2$ to $C_{23}$ olefins, hydrogenated random and block copolymers of a vinyl aromatic compound and at least one conjugated diene, or hydrogenated random and block copolymers of mixtures of conjugated dienes.

20. The functionalized olefin copolymer of claim 19 wherein the copolymer of ethylene and one or more $C_3$–$C_{23}$ alpha-monoolefins is an ethylene-propylene copolymer.

21. The functionalized olefin copolymer of claim 18 wherein said performance enhancing compound comprises N-phenyl-phenylene diamine.

22. The functionalized olefin copolymer of claim 18 wherein said coupling compound comprises at least one member selected from the group consisting of aminoguanidine bicarbonate, hexamethylene diamine-2-propylene oxide, hexamethylene diamine-3-propylene oxide, hexamethylene diamine-4-propylene oxide, a Mannich condensation product formed from a hydroxyaromatic compound, an aldehyde and a polyalkenyl polyamine, and mixtures thereof.

23. An oil concentrate containing, on an active ingredient basis, 20 to 90 weight percent of a carrier or diluent oil and from about 3 to 45 weight percent of the functionalized olefin copolymer of claim 18.

24. The oil concentrate of claim 23 further comprising at least one additive selected from the group consisting of viscosity index improvers, antioxidants, corrosion inhibitors, detergents, dispersants, pour point depressants, antiwear agents, antifoamants, demulsifiers and friction modifiers.

25. A lubricating oil composition a major amount of an oil of lubricating viscosity and a minor amount of the functionalized olefin copolymer of claim 18.

26. The lubricating composition of claim 25 further comprising at least one additive selected from the group consisting of viscosity index improvers, antioxidants, corrosion inhibitors, detergents, dispersants, pour point depressants, antiwear agents, antifoamants, demulsifiers and friction modifiers.

27. A method of improving the fuel economy of a vehicle having a crankcase containing a lubricating oil wherein said method comprises adding to and operating in the crankcase of the vehicle the lubricating oil composition of claim 25.

28. A method of improving the low temperature viscometric properties of a lubricating oil, said method comprising adding to an oil of lubricating viscosity a minor amount of the functionalized olefin copolymer of claim 18.

29. A process for preparing a functionalized olefin copolymer comprising the steps of reacting an acylating olefin copolymer having a number average molecular weight of from 700 to 500,000 and having 0.5 to 6 molecules of carboxylic reactant per molecule olefin copolymer with an aromatic amine performance enhancing compound and a coupling compound at a temperature in the range of 120° to 200° C., wherein the reaction of the acylated olefin polymer with the coupling compound is before, after or simultaneous with reaction of the performance enhancing compound and the acylated olefin copolymer; wherein said coupling compound is selected from the group consisting of mixtures of 2,4- and 2,6-isomers of dimethylthiotoluene diamine, polyhydroxy amines, and amino guanidines; and wherein the performance enhancing compound is selected from the group consisting of aryl polyamines, aminocarbazoles, aminoindoles, aminopyrroles, amino-indazolinones, aminoperimidines, mercaptotriazoles, aminophenothiazines, pyridines, pyrazines, pyrimidines, aminothiadiazoles, aminothiothiadiazoles, aminobenzotriazoles, mercaptobenzothiazoles, and mercaptobenzoimidazoles; and wherein the acylated olefin copolymer is reacted with from 0.5 to 85 mol % coupling compound and 15 to 99.5 mol % performance enhancing compound per mol of acylating agent.

30. The process for preparing a functionalized olefin copolymer of claim 29 wherein the olefin copolymer substrate is selected from copolymers of polymerizable $C_2$ to $C_{23}$ olefins, hydrogenated random and block copolymers of a vinyl aromatic compound and at least one conjugated diene, or hydrogenated random and block copolymers of mixtures of conjugated dienes.

31. The process for preparing a functionalized olefin copolymer of claim 30 wherein the olefin copolymer substrate comprises an ethylene-propylene copolymer.

32. The process for preparing a functionalized olefin copolymer of claim 29 wherein said performance enhancing compound comprises N-phenyl-phenylene diamine.

33. The process for preparing a functionalized olefin copolymer of claim 29 wherein said coupling compound comprises at least one member selected from the group consisting of aminoguanidine bicarbonate, hexamethylene diamine-2-propylene oxide, hexamethylene diamine-3-propylene oxide, hexamethylene diamine-4-propylene oxide, a Mannich condensation product formed from a hydroxyaromatic compound, an aldehyde and a polyalkenyl polyamine, and mixtures thereof.

34. An oil concentrate containing, on an active ingredient basis, 20 to 90 weight percent of a carrier or diluent oil and from about 3 to 45 weight percent of a functionalized olefin copolymer prepared by the process of claim 29.

35. The oil concentrate of claim 34 further comprising at least one additive selected from the group consisting of viscosity index improvers, antioxidants, corrosion inhibitors, detergents, dispersants, pour point depressants, antiwear agents, antifoamants, demulsifiers and friction modifiers.

36. A lubricating oil composition comprising a major amount of an oil of lubricating viscosity and a minor amount of the functionalized olefin copolymer prepared by the process of claim 29.

37. The lubricating composition of claim 36 further comprising at least one additive selected from the group consisting of viscosity index improvers, antioxidants, corrosion inhibitors, detergents, dispersants, pour point depressants, antiwear agents, antifoamants, demulsifiers and friction modifiers.

38. A method of improving the fuel economy of a vehicle having a crankcase containing a lubricating oil wherein said method comprises adding to and operating in the crankcase of the vehicle the lubricating oil composition of claim 36.

39. A method of improving the low temperature viscometric properties of a lubricating oil, said method comprising adding to an oil of lubricating viscosity a minor amount of the functionalized olefin copolymer prepared by the process of claim 29.

* * * * *